(12) United States Patent
Thuries

(10) Patent No.: US 7,490,776 B2
(45) Date of Patent: Feb. 17, 2009

(54) SENSOR CONTROL OF AN AIMING BEAM OF AN AUTOMATIC DATA COLLECTION DEVICE, SUCH AS A BARCODE READER

(75) Inventor: Serge Thuries, Saint Jean (FR)

(73) Assignee: Intermec Scanner Technology Center, Labege Cedex (FR)

( * ) Notice: Subject to any disclaimer, the term of this patent is extended or adjusted under 35 U.S.C. 154(b) by 426 days.

(21) Appl. No.: 11/280,955

(22) Filed: Nov. 16, 2005

(65) Prior Publication Data

US 2007/0108283 A1    May 17, 2007

(51) Int. Cl.
*G06K 7/10*    (2006.01)
(52) U.S. Cl. .............. 235/472.01; 235/454; 235/462.45
(58) Field of Classification Search ............. 235/472.1, 235/462.4, 462.25, 455, 454; 359/196
See application file for complete search history.

(56) References Cited

U.S. PATENT DOCUMENTS

| | | | |
|---|---|---|---|
| 4,820,911 A | 4/1989 | Arackellian et al. | |
| 4,933,538 A | 6/1990 | Heiman et al. | |
| 4,988,852 A | 1/1991 | Krishnan | 235/462 |
| 5,378,883 A | 1/1995 | Batterman et al. | 235/472 |
| 5,550,364 A | 8/1996 | Rudeen | 235/462 |
| 5,627,360 A | 5/1997 | Rudeen | 235/462 |
| 5,640,001 A | 6/1997 | Danielson et al. | 235/472 |
| 5,690,418 A | 11/1997 | Hsiung | 362/259 |
| 5,734,153 A | 3/1998 | Swartz et al. | 235/472 |
| 5,756,981 A | 5/1998 | Roustaei et al. | 235/462 |
| 5,770,841 A | 6/1998 | Moed et al. | |
| 5,880,451 A | 3/1999 | Smith et al. | |
| 6,003,775 A | 12/1999 | Ackley | 235/472.01 |
| 6,060,722 A | 5/2000 | Havens et al. | |
| 6,095,422 A | 8/2000 | Ogami | |
| 6,138,915 A | 10/2000 | Danielson et al. | 235/472.02 |
| 6,216,950 B1* | 4/2001 | Ohkawa et al. | 235/462.4 |
| 6,223,988 B1 | 5/2001 | Batterman et al. | 235/472.01 |
| 6,330,974 B1 | 12/2001 | Ackley | 235/472.01 |
| 6,332,577 B1* | 12/2001 | Acosta et al. | 235/472.01 |
| 6,340,114 B1 | 1/2002 | Correa et al. | 235/462.22 |
| 6,398,112 B1 | 6/2002 | Li et al. | 235/462.01 |
| 6,417,840 B1 | 7/2002 | Daniels | 345/158 |
| 6,491,223 B1 | 12/2002 | Longacre, Jr. et al. | 235/462.01 |
| 6,572,019 B1 | 6/2003 | Rando et al. | |
| 6,641,042 B1 | 11/2003 | Pierenkemper et al. | |
| 6,641,046 B2 | 11/2003 | Durbin | 235/472.01 |

(Continued)

OTHER PUBLICATIONS

U.S. Appl. No. 11/149,452, filed Jun. 8, 2005, Jolivet et al.

(Continued)

*Primary Examiner*—Edwyn Labaze
(74) *Attorney, Agent, or Firm*—Seed IP Law Group PLLC

(57) ABSTRACT

An automatic data collection device is provided with an aiming beam that can be deactivated prior to reading a target machine-readable symbol. The data collection device includes a sensor that generates one or more signals associated with light received by the sensor. The sensor signal(s) is used to adjust the illumination levels for the sensor and/or the gain of the sensor, and are also used to deactivate the aiming beam prior to reading the target machine-readable symbol or to perform other illumination adjustment.

24 Claims, 4 Drawing Sheets

U.S. PATENT DOCUMENTS

| | | | |
|---|---|---|---|
| 6,659,350 B2 | 12/2003 | Schwartz et al. | 235/462.42 |
| 6,708,883 B2 * | 3/2004 | Krichever | 235/462.01 |
| 6,729,546 B2 | 5/2004 | Roustaei | 235/462.45 |
| 7,090,137 B1 | 8/2006 | Bennett | |
| 7,121,469 B2 | 10/2006 | Dorai et al. | |
| 2004/0206823 A1 | 10/2004 | Blake et al. | |
| 2005/0274806 A1 | 12/2005 | Dant | 235/462.21 |
| 2006/0097053 A1 | 5/2006 | Jolivet et al. | |
| 2006/0261167 A1 | 11/2006 | Ray et al. | |
| 2007/0040012 A1 | 2/2007 | Lin et al. | |
| 2007/0084926 A1 | 4/2007 | Lopez et al. | |
| 2007/0164112 A1 | 7/2007 | Dant | |

OTHER PUBLICATIONS

U.S. Appl. No. 60/681,779, filed May 17, 2005, Ray et al.
U.S. Appl. No. 60/709,709, filed Aug. 18, 2005, Lopez et al.
U.S. Appl. No. 60/756,319, filed Jan. 4, 2006, Dant.
Intermec Technologies Corp., "1470/1471 Imager—User's Manual," P/N 067054-003, pp. 1-9, 3-21 to 3-36, 2001.

* cited by examiner

SENSOR CONTROL OF AN AIMING BEAM OF AN AUTOMATIC DATA COLLECTION DEVICE, SUCH AS A BARCODE READER

TECHNICAL FIELD

The present disclosure relates generally to electronic devices for reading data carriers, such as machine-readable symbols (e.g., matrix codes, barcodes, stacked codes, and the like), and more particularly but not exclusively, relates to techniques to effectively use an aiming beam in conjunction with a data acquisition beam of an automatic data collection device.

BACKGROUND INFORMATION

The automatic data collection (ADC) arts include numerous systems for representing information in machine-readable form. For example, a variety of symbologies exist for representing information in barcode symbols, matrix or area code symbols, and/or stacked symbols. A symbology typically refers to a set of machine-readable symbol characters, some of which are mapped to a set of human-recognizable symbols such as alphabetic characters and/or numeric values. Machine-readable symbols are typically composed of machine-readable symbol characters selected from the particular symbology to encode information. Machine-readable symbols typically encode information about an object on which the machine-readable symbol is printed, etched, carried or attached to, for example, via packaging or a tag.

Barcode symbols are a common one-dimensional (1D) form of machine-readable symbols. Barcode symbols typically comprise a pattern of vertical bars of various widths separated by spaces of various widths, with information encoded in the relative thickness of the bars and/or spaces, each of which have different light reflecting properties. One-dimensional barcode symbols require a relatively large space to convey a small amount of data.

Two-dimensional symbologies have been developed to increase the data density of machine-readable symbols. Some examples of two-dimensional symbologies include stacked code symbologies. Stacked code symbologies may be employed where length limitations undesirably limit the amount of information in the machine-readable symbol. Stacked code symbols typically employ several lines of vertically stacked one-dimensional symbols. The increase in information density is realized by reducing or eliminating the space that would typically be required between individual barcode symbols.

Some other examples of two-dimensional symbologies include matrix or area code symbologies (hereinafter matrix code). A matrix code machine-readable symbol typically has a two-dimensional perimeter, and comprises a number of geometric elements distributed in a pattern within the perimeter. The perimeter may, for example, be generally square, rectangular or round. The geometric elements may, for example, be square, round, or polygonal, for example hexagonal. The two-dimensional nature of such a machine-readable symbol allows more information to be encoded in a given area than a one-dimensional barcode symbol.

The various above-described machine-readable symbols may or may not also employ color to increase information density.

A variety of machine-readable symbol readers for reading machine-readable symbols are known. Machine-readable symbol readers typically employ one of two fundamental approaches, scanning or imaging.

In scanning, a focused beam of light is scanned across the machine-readable symbol, and light reflected from and modulated by the machine-readable symbol is received by the reader and demodulated. With some readers, the machine-readable symbol is moved past the reader, with other readers the reader is moved past the machine-readable symbol, and still other readers move the beam of light across the machine-readable symbol while the reader and machine-readable symbol remain approximately fixed with respect to one another. Demodulation typically includes an analog-to-digital conversion and a decoding of the resulting digital signal.

Scanning type machine-readable symbol readers typically employ a source of coherent light such as a laser diode to produce a beam, and employ a beam deflection system such as an rotating or oscillating mirror to scan the resulting beam across the machine-readable symbols. Conventional laser scanning systems employ progressive symbol sampling.

In imaging, the machine-readable symbol reader may flood the machine-readable symbol with light, or may rely on ambient lighting. A one-dimensional (linear) or two-dimensional image (2D) capture device or imager such as a charge coupled device (CCD) array captures a digital image of the illuminated machine-readable symbol, typically by electronically sampling or scanning the pixels of the two-dimensional image capture device. The captured image is then decoded, typically without the need to perform an analog to digital conversion.

A two-dimensional machine-readable symbol reader system may convert, for example, two-dimensional symbols into pixels. See, for example, U.S. Pat. No. 4,988,852 issued to Krishnan, U.S. Pat. No. 5,378,883 issued to Batterman, et al., U.S. Pat. No. 6,330,974 issued to Ackley, U.S. Pat. No. 6,484,944 issued to Manine, et al., and U.S. Pat. No. 6,732,930 issued to Massieu, et al.

Regardless of the type of data carrier used, their usefulness is limited by the capability of a data collection device (such as a matrix code reader, bar code reader, and the like) to accurately capture the data encoded in the machine-readable symbol. Optical data collection devices are directional in nature—such devices need to be optimally positioned in order to accurately read the data on the target symbol. If the data collection device is pointed askew to the symbol, for example, then the data may not be read or may be read incorrectly. The inability of an inexperienced user to skillfully position the data collection device also contributes to the directional limitations of such devices, thereby further contributing to the chances of erroneous or missed data readings.

Furthermore in many situations, the acquisition beam (e.g., the scanning beam the context of a scanner type symbol reader, the flood illumination beam in the context of an imager type symbol reader, or other light beam that is output by the data collection device to read the target symbol) from the data collection device is invisible or has low-visibility. The invisibility or low-visibility of the acquisition beam adversely affects the user's ability to determine whether the data collection device is optimally positioned at a target symbol. This drawback becomes quite apparent in a situation where the user has to specifically locate and accurately read a particular individual symbol among several different symbols that are clustered near one another, such as when large quantities of inventory are stacked on a shelf. In such a situation, the user needs to carefully operate the data collection device to ensure that the desired symbol (rather than an adjacent symbol) is being read.

To assist the user, many data collection devices use an aiming beam (sometimes referred to as a "spotter beam") in addition to the acquisition beam. For example with imager type symbol readers, the aiming beam can be a plurality of light beams (such as laser light) that provide one or more spots, boxes, crossing dots, or some other 2D pattern, so as to assist the user in roughly identifying the intended target area. The aiming beam is typically provided by way of a separate electronic circuit and/or by an electronic circuit that outputs a flashing light having a fixed frequency. Once the aiming beam has identified the target area for the user, the user can activate the acquisition beam to capture an image the symbol.

There are drawbacks to using these types of aiming beams for imager type symbol readers. One drawback is that there are added costs and complexity associated with providing a separate dedicated electronic circuit to operate the aiming beam in a manner that ensures deactivation of the aiming beam prior to image acquisition, since an illumination pattern produced by the aiming beam on the target area can interfere with the image to be captured by the acquisition beam. A flashing fixed-frequency aiming beam reduces the prominence of the illumination pattern on the target area during image acquisition, but the flashing of the aiming beam is user-perceptible and therefore can be annoying to the user after extended periods of use of the data collection device.

BRIEF SUMMARY OF THE INVENTION

One aspect provides an automatic data collection device to read data carriers such as machine-readable symbols. The automatic data collection device includes a first light source to generate an aiming beam that can be directed at a target machine-readable symbol. A second light source generates an acquisition beam to read data encoded in the target machine-readable symbol. A sensor receives at least a portion light reflected from the target the machine-readable symbol and generates a sensor signal that is associated with the received light. A component coupled to the sensor deactivates the aiming beam, based on the sensor signal generated by the sensor, prior to reading the target machine-readable symbol with the acquisition beam.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
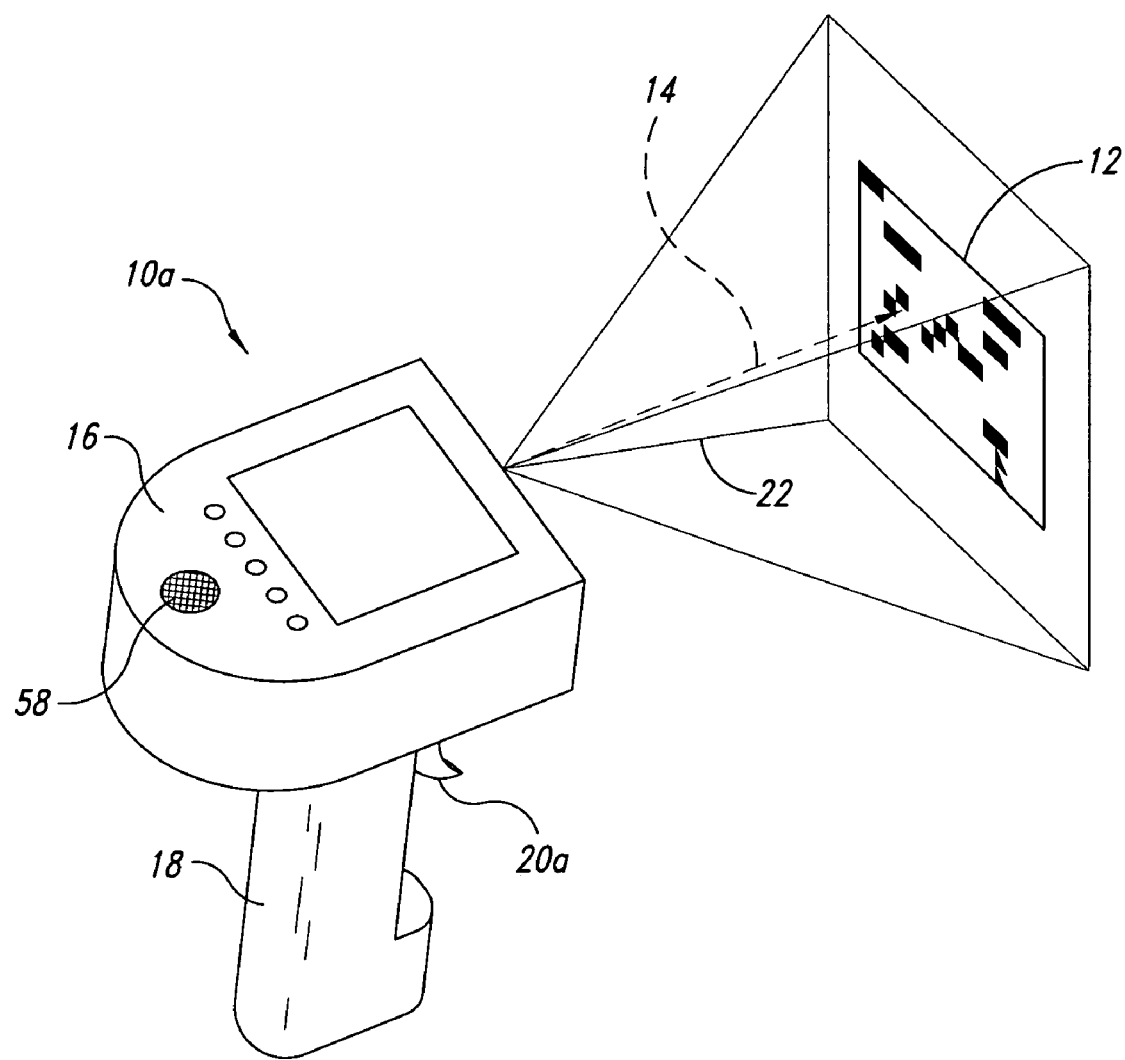
FIG. 1 is an upper isometric view of an embodiment of a data collection device directing an aiming beam and an acquisition beam towards at least one target machine-readable symbol.

Embodiments of techniques for sensor control of the operation (e.g., deactivation) of an aiming beam of an automatic data collection device for reading machine-readable symbols are described herein. In the following description, numerous specific details are given to provide a thorough understanding of embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments As an overview, an automatic data collection device of an embodiment is provided for reading, matrix code symbols, barcode symbols, stacked code symbols, or other one-dimensional (1D) or two-dimensional (2D) machine-readable symbols. The data collection device of one embodiment is handheld and provides an aiming beam to assist a user in optimally positioning the data collection device for reading a target machine-readable symbol, such as for acquiring an image of a matrix code symbol. The aiming beam is controlled or otherwise responsive to a sensor of the data collection device, such that the aiming beam is deactivated before image acquisition is performed, thereby avoiding any interference with the image to be acquired. The sensor provides at least one signal usable to control illumination of the target symbol, such as a signal to control lighting levels provided by an illumination source. Alternatively or additionally, the sensor can provide a signal to control a sensitivity (e.g., gain) of the sensor. Further alternatively or additionally, the sensor can provide a signal to adjust an aperture of the data collection device, which allows control over the amount of light received by the sensor. One embodiment uses one or more of these sensor signals associated with the light received by the sensor to control deactivation of the aiming beam prior to image acquisition. Since such sensor signals are normally provided during operation of the data collection device, an embodiment can take advantageously use the same sensor signal(s) for controlling aiming beam deactivation, thereby avoiding the need to provide the separate complex circuitry for a flashing aiming beam or other dedicated complex aiming beam circuitry as previously described above for existing data collection devices.

In another embodiment, an automatic data collection device to read data carriers, such as machine-readable symbols, includes a first light source to generate an aiming beam that can be directed at a target machine-readable symbol. A second light source and/or ambient light provides an acquisition beam to read data encoded in the target machine-readable symbol. A sensor receives at least a portion light reflected from the target the machine-readable symbol and generates a sensor signal that is associated with the received light. A component coupled to the sensor adjusts one or more image acquisition parameters so as to improve the image at the sensor. Based on the sensor signal generated by the sensor, the component may also deactivate the aiming beam prior to reading the target machine-readable symbol with the acquisition beam Alternatively or additionally to imager type data collection devices, another embodiment can provide sensor control of the aiming beam of a scanner type data collection device, such as a barcode symbol scanner. In such an embodiment, the sensor provides one or more signals (such as signals to increase illumination, adjust a gain, and/or adjust an aperture)

that is usable to control deactivation of the aiming beam prior to scanning, so as to avoid interfering with the scanning process.

FIG. 1 shows an automatic data collection device 10a for reading one or more target machine-readable symbols, such a matrix code symbol 12 or some other machine-readable symbol using an imaging technique. While the matrix code symbol 12 is illustrated, it is appreciated that the machine-readable symbol may be embodied as any other type of two-dimensional (2D) symbol that can be advantageously located using an aiming beam 14, such a stacked code symbol for instance. It is also appreciated that one-dimensional (1D) machine-readable symbols (such as barcode symbols) or other types of machine-readable symbols may be read using imaging performed by the data collection device 10a. For the sake of simplicity of explanation hereinafter and unless the context is otherwise, the various embodiments pertaining to the data collection device 10a of FIG. 1 will be described with respect to a target machine-readable symbol being in the form of the matrix code symbol 12.

The data collection device 10a includes a head 16, a handle 18, and an actuator such as a trigger 20a. While the trigger 20a is shown with a specific shape and in a specific location in the embodiment of FIG. 1, other embodiments may employ different arrangements. For example, the trigger 20a can be embodied as a side-mounted finger trigger, top-mounted thumb trigger, button or key, touch screen, and other trigger arrangements. One embodiment further provides a proximity trigger, which uses optics, acoustics, or other mechanism to determine proximity of an object to automatically activate without requiring a user to pull the trigger. In one embodiment, the trigger 20a can be implemented as a multi-position trigger that can be pulled/pressed in stages. For example, an initial press (e.g., pressing the trigger 20a halfway) can be used to perform aiming and initial illumination for sensor adjustment purposes, and a further press (e.g., further pressing the trigger 20a to its fully pressed position) can be used to perform data acquisition via imaging (e.g., "shutter activation"). In other embodiments, the trigger 20a can be actuated using successive trigger pulls to perform certain operations, analogous to single or double clicking a mouse.

In yet other embodiments, image acquisition can be automatically initiated after expiration of a set time period after the data collection device has been pointed at the matrix code symbol 12, or automatically initiated after sensing a lack of movement of the data collection device 10a, generally indicating that the data collection device 10a is being pointed at a desired target symbol.

The data collection device 10a can comprise a portable data collection device, a hand-held scanning device, or other suitable electronic device having the various data reading capabilities described herein. It is appreciated that some embodiments are provided that may not necessarily have the same shape or identical features or identical use as the embodiments illustrated in the various figures. However, such embodiments can nevertheless include the aiming beam 14 that can be deactivated prior to image acquisition.

The aiming beam 14 of FIG. 1 is symbolically depicted in broken lines as one or more beams of light directed at the matrix code symbol 12. The aiming beam 14 is shown in broken lines to visually represent that the aiming beam 14 is deactivated when imaging is performed using an acquisition beam 22.

The aiming beam 14 can generate various patterns of light over the target area, including but not limited to one or more spots, boxes, crossing dots, or some other user-perceptible 1D or 2D pattern that assists the user in positioning the data collection device 10a. The aiming beam 14 allows the user to visually locate a target machine-readable symbol or to otherwise visually verify the positioning (such as orientation) of the data collection device 10a relative to the target symbol, such as the matrix code symbol 12. Additionally, the aiming beam 14 can assist the user in determining whether the data collection device 10a is optimally positioned in terms of distance from the matrix code symbol 12 (i.e., range finding).

In one embodiment, the aiming beam 14 can be generated using one or more light sources that are suitably arranged to generate a desired size, pattern, and/or shape of a resulting visual indicator at the target area. Examples of such light sources include laser light sources, light emitting diodes (LEDs), or other types of light sources that generate light that is visible to the user. For example, a plurality of LEDs can be arranged in a row at the data collection device 10a, such that the LEDs generate parallel collimated light beams that provide a segment of light that can be positioned on the matrix code symbol 12.

An illumination pattern generated by the acquisition beam 22 over the target area can comprise various shapes such as substantially square, rectangular, elliptical, circular, or other illumination pattern having major and minor axes. The size and shape of the illumination pattern produced by the acquisition beam 22 is such that the illumination pattern fully covers (and perhaps overlaps into the background on the matrix code 12 during image acquisition. In the illustrative example of FIG. 1, the acquisition beam 22 produces a generally rectangular illumination pattern.

In a scanning implementation, the acquisition beam 22 comprises a scanning beam of light that is moved over the matrix code symbol 12, a barcode symbol, a stacked code symbol, or other type of machine-readable symbol. According to an embodiment, the aiming beam 14 can be deactivated prior to scanning by the acquisition beam 22, so as to avoid interfering with the target machine-readable symbol to be scanned, or deactivated for some other purpose, such as energy conservation or to avoid user annoyance.

Figure 2:
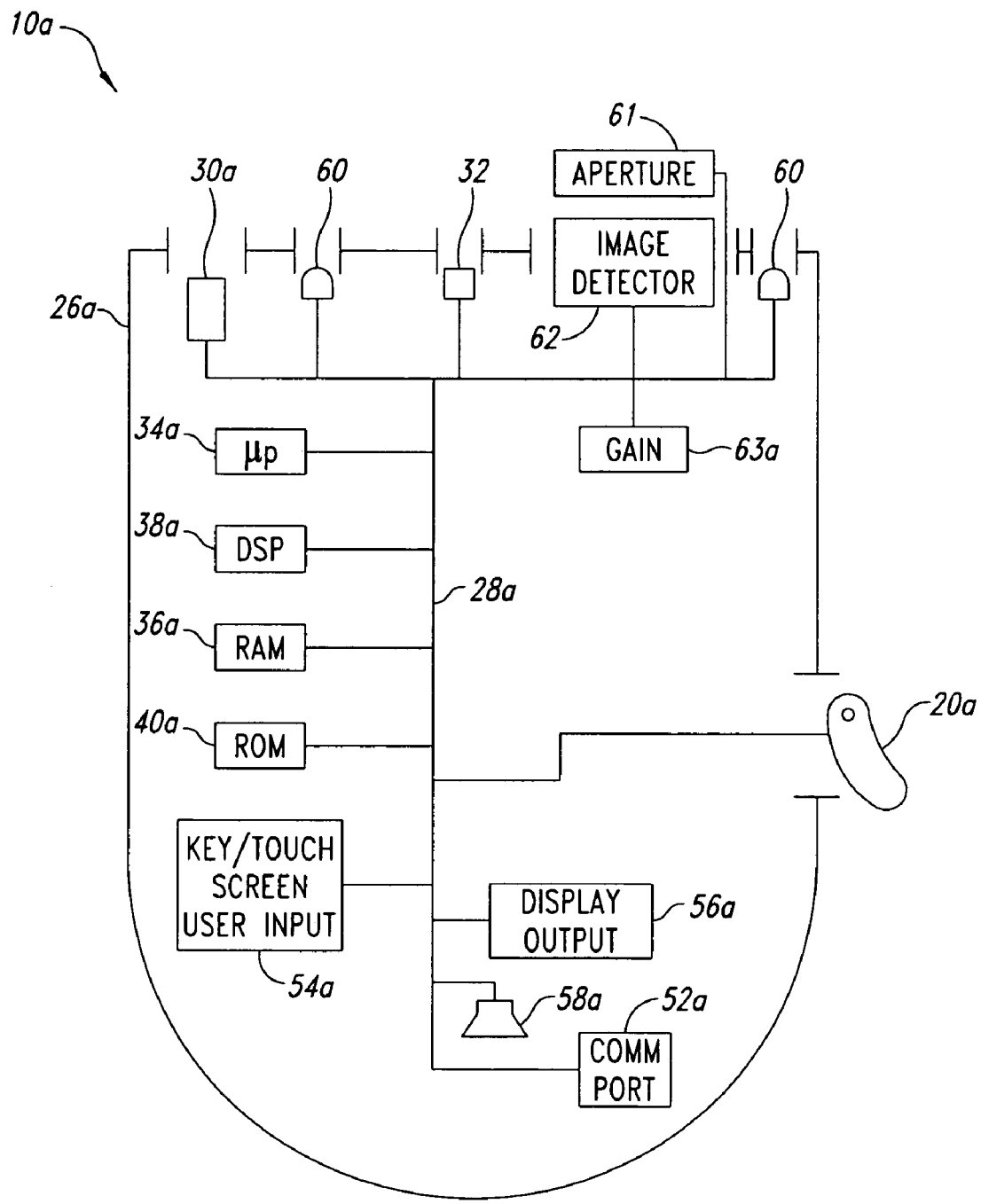
FIG. 2 is a functional block diagram of an embodiment of the data collection device.

FIG. 2 is a functional block diagram of an embodiment of the data collection devices 10a, and in particular an imager type data collection device. While the block diagram of FIG. 2 depicts a dedicated 2D and/or 1D data collection device that uses imaging (i.e., a single-mode device), such a data collection device is illustrated and described as a single-mode device only for convenience and clarity. The features depicted in the illustrated embodiment(s) can be suitably implemented in a multi-mode data collection device that is capable to read any one or more of 1D, 2D, or other type of machine-readable symbols using imaging or scanning, and/or which may additionally read other types of automatic data collection (ADC) data carriers, including RFID and acoustical data carriers, for example.

As shown in the embodiment of FIG. 2, the data collection device 10a has a housing 26a that carries various components, symbolically shown as being coupled together via a bus 28a. The bus 28a provides data, commands, and/or power to the various components of the data collection device 10a. The data collection device 10a can include an internal power source such as a rechargeable battery (not shown), or can receive power from an external power source such as a wall outlet by way of an electrical cord (not shown).

The data collection device 10a includes a flood illumination source 60, such as a plurality of light sources, to substantially illuminate a target symbol such as the matrix code symbol 12. The flood illumination source 60 can be in the form of one or more LED light sources or other suitable type of light source(s) that can be used for target illumination in the manner previously described above.

An image detector 62 is positioned to receive illumination reflected from the target symbol during image acquisition of the matrix code symbol 12 or other target symbol. The image detector 62 can take the form of a one- or two-dimensional charge coupled device (CCD) array, for example, or other suitable image sensor. The image detector 62 of various embodiments can implement linear imagers, 2D imagers, or other types of imagers usable with a variety of light sources. In certain embodiments, the data collection device 10a can omit or reduce the output of the illumination source 60 for purposes of image acquisition, for example where the image detector 62 is a two-dimensional CCD array operable with ambient light.

In one embodiment, a photodetector, phototransistor, or other light detector 32 can be positioned proximate to the image detector 62. The light detector 32 is positioned in a manner to sense the illumination that is received by the image detector 62 (e.g., light from the illumination source 60 that is reflected from the matrix code symbol 12, ambient light, and/or light from the aiming beam 14 that is reflected from the matrix code symbol 12) and to generate an electrical signal (or other type of signal) representative of the received illumination. The signal generated by the light detector 32 can be used to determine whether the image detector 62 is receiving sufficient light. If the image detector 62 is not receiving sufficient light, the illumination source 60 can be controlled to increase its output.

As an example, the light detector 32 can sense the strength of ambient light. Based on the strength of the ambient light, a determination can be made whether additional light is needed in order to properly perform image acquisition. Thus in such an embodiment, the illumination source 60 can be controlled to provide additional light to supplement the ambient light.

Alternatively or additionally to using the light detector 32, an adjustable aperture 61 can be provided to control the amount of light received by the image detector 62. The aperture 61 of one embodiment can comprise an electromechanical assembly that can increase size of an opening to allow the image detector 62 to receive more light, or can decrease the size of the opening to reduce the amount of received light. A control signal can be provided to the aperture 61 to adjust the size of its opening, and such control signal can be based on, for instance, the signal provided by the light detector 32 that is indicative of the amount of light being received by the image detector 62.

Alternatively or additionally to using the light detector 62 and/or the aperture 61 to control the amount of light received by the image detector 62, a gain of the image detector 62 can be increased or decreased based on the amount of the received light (i.e., sensitivity adjustment). The gain of the image detector 62 can be adjusted using a gain unit 63a, which can be embodied as an automatic gain control (AGC) unit or other gain adjustment element. In an embodiment, the gain unit 63a can adjust the sensitivity of the image detector 62 based on the signal provided by the light detector 32, based on a signal provided to the aperture 61 to change the size of its opening, based on the quality (e.g., resolution, brightness, etc.) of the image captured by the image detector 62, and/or based on some other signal or parameter.

In an embodiment, the image detector 62 in combination with any one or more of the illumination source 60, the light detector 32, the gain unit 63a, the aperture 61, a microprocessor 34a, and/or other components of the data collection device 10a together comprise a sensor or sensor assembly portion of the data collection device 10a. It is appreciated that there may be other components included with the sensor (or sensor assembly), but for the sake of brevity, only the relevant components are shown and described herein. The manner in which one or more sensor signals (e.g., the signal from the light detector 32 that is indicative of received light and that is used to adjust illumination, the signal provided to the aperture to increase or decrease opening size, the signal provided to the gain unit 63a to adjust gain/sensitivity, or signals derived therefrom) will be described later below with respect to FIG. 4.

The data collection device 10a includes an aiming light source 30a that generates the aiming beam 14. The aiming light source 30a can comprise one or more laser light sources, light-emitting diodes (LEDs), or other suitable light-generating component(s) that provides a user-perceptible light. The aiming light source 30a can be selectively activated and deactivated based on the sensor signal(s), so as to avoid interfering with the image acquisition process, for example.

The data collection device 10a of FIG. 2 includes at least one microprocessor, controller, microcontroller, or other processor, which are symbolically shown as the single microprocessor 34a. It is appreciated that the data collection device 10a may include separate dedicated processors for reading and processing matrix code symbols, RFID tags, acoustical tags, barcode symbols, other data carriers, and the like, as well as one or more processors for controlling operation of the data collection device 10a.

Moreover, in one example embodiment at least one digital signal processor (DSP) 38a may be provided to cooperate with the microprocessor 34a to process signals and data returned from the symbols. Such signal processing may be performed for purposes of reading data from signals received from the target symbol. For instance during decoding, the DSP 38a can perform image processing to extract the encoded data from the captured image of the matrix code symbol 12. The DSP 38a can also be used to process signals that result from scanning 1D or 2D machine-readable symbols.

Alternatively or additionally, the microprocessor 34a can execute software or other machine-readable instructions stored in a machine-readable storage medium in order to perform the decoding or to otherwise control operation of the data collection device 10a, including operations pertaining to deactivation of the aiming beam 14 prior to image acquisition. Such storage medium can be embodied by a random access memory (RAM) 36a, a read only memory (ROM) 40a, or other storage medium. The software stored in the storage medium can include a decoding algorithm.

In the context of deactivation of the aiming beam 14, for example, the microprocessor 34a can generate a signal to turn OFF the aiming light source 30a based on the signal provided by the light detector 32, based on the signal provided to the aperture to increase or decrease opening size, based on the signal provided to the gain unit 63a to adjust gain/sensitivity, and/or based on some other signal associated with the illumination received by the image detector 62. Alternatively or additionally, the microprocessor 34a can deactivate the aiming light source 30a in response to activation of the trigger 20a. These aspects will be described later below with respect to FIG. 4.

In an embodiment, the ROM 40a stores instructions for execution by the microprocessor 34a to operate the various components of the data collection device 10a, including instructions pertaining to deactivation of the aiming light source 30a prior to image acquisition. The ROM 40a can also contain instructions for the microprocessor 34a that permit the microprocessor 34a to control the image detector 62 to capture image data and to decode and/or manipulate the captured image data. As used in this herein, ROM includes any non-volatile memory, including erasable memories such as EEPROMs.

The RAM 36a is provided to temporarily store data, such as a captured image data from the image sensor 62. The RAM 36a can also store other types of data, such as variable values, results of calculations, state data, or other information.

Symbol reading and decoding technology is well known in the art and will not be discussed in further detail. Many alternatives for image sensors, symbol decoders, and optical elements that can be used in the data collection device 10a are taught in the book, The Bar Code Book, Third Edition, by Roger C. Palmer, Helmers Publishing, Inc., Peterborough, N.H., U.S.A. (1995) (ISBN 0-911261-09-5). Useful embodiments can also be derived from the various components disclosed in U.S. Pat. No. 6,286,763, issued Sep. 11, 2001, and assigned to the same assignee as the present application.

The data collection device 10a can include a communication port 52a to provide communications to external devices. The communication port 52a can be a hardwire or wireless interface, and can even employ an antenna, radio, USB connection, Ethernet connection, modem, or other type of communication device. The communication port 52a can provide communications over a communications network (not shown) to a host (not shown), allowing transmissions of data and/or commands between the data collection device 10a and the host. The communications network can take the form of a wired network, for example a local area network (LAN) (e.g., Ethernet, Token Ring), a wide area network (WAN), the Internet, the World Wide Web (WWW), wireless LAN (WLAN), wireless personal area network (WPAN), and other network. Alternatively or additionally, the communications network can be a wireless network, for example, employing infrared (IR), satellite, and/or RF communications.

The data collection device 10a includes a keypad, mouse, touch screen, or other user input device 54a to allow user input. It is appreciated that other devices for providing user input can be used. The user input device 54a is usable to allow the user to select modes (e.g., modes for reading matrix code symbols, barcode symbols, or other symbols), turn the data collection device 10a ON/OFF, adjust power levels, and others. The bus 28a couples the user input device 54a to the microprocessor 34a to allow the user to enter data and commands.

The bus 28a also couples the trigger 20a to the microprocessor 34a. In response to activation of the trigger 20a, the microprocessor 34a can cause the illumination source 60 to emit light for target illumination. A subsequent or additional pressing of the trigger 20a can be used to activate image acquisition.

The data collection device 10a includes human-perceptible visual (e.g., a display output) and audio indicators 56a and 58a respectively. The bus 28a couples the visual and audio indicators 56a and 58a to the microprocessor 34a for control thereby. The visual indicators 56a take a variety of forms, for example: light emitting diodes (LEDs) or a graphic display such as a liquid crystal display (LCD) having pixels. These or other visual indicators can also provide other data associated with the operation of the data collection device 10a, such as visual indicators to indicate whether the data collection device 10a is ON/OFF, reading, interrogating, low on battery power, successful or unsuccessful reads/interrogations, and so forth.

The audio indicator 58a can take the form of one or more dynamic, electrostatic or piezo-electric speakers, for example, operable to produce a variety of sounds (e.g., clicks and beeps), and/or frequencies (e.g., tones), and to operate at different volumes. Such sounds can convey various types of information, such as whether a symbol was successfully or unsuccessfully read, low battery power, or other information.

Figure 3:
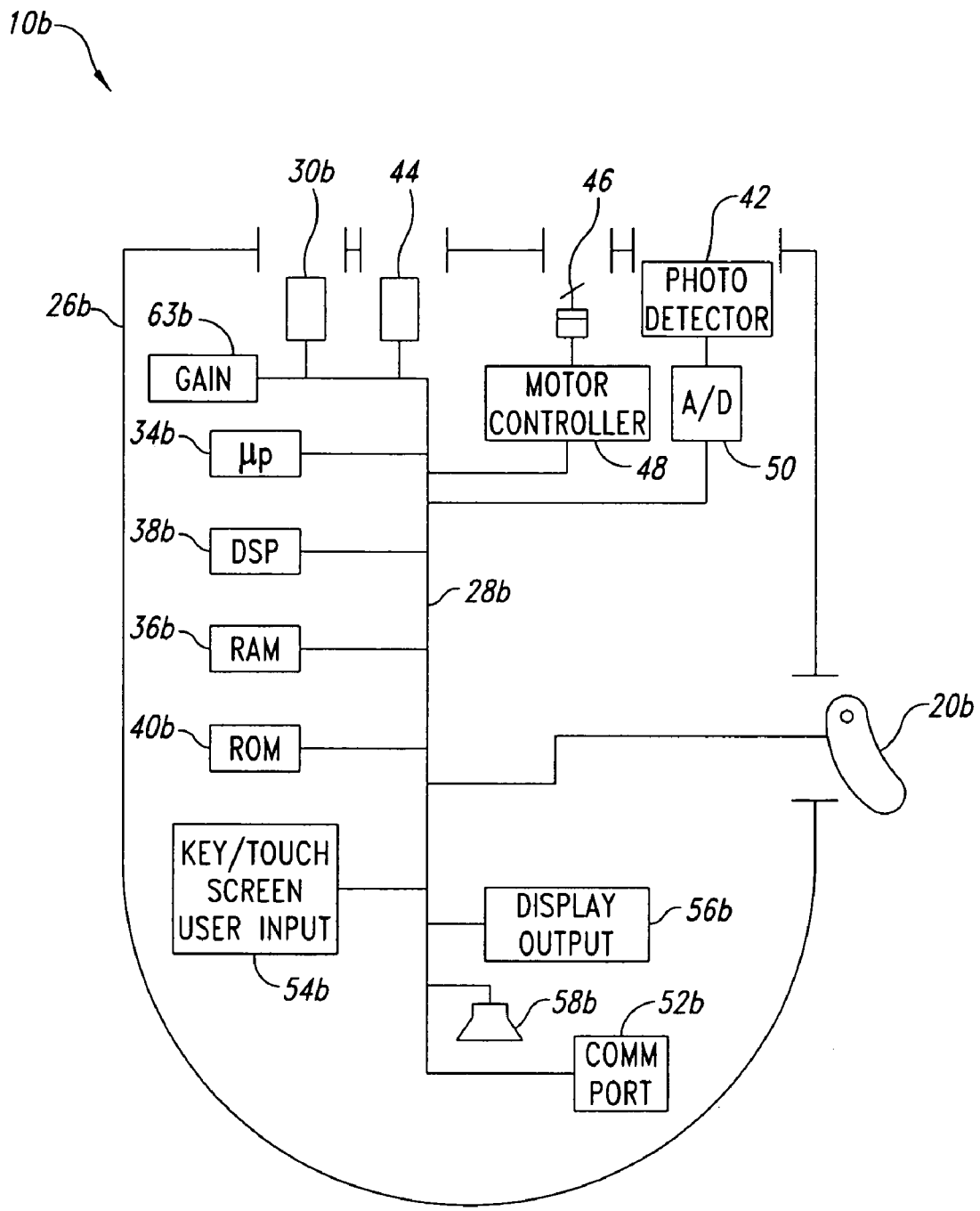
FIG. 3 is a functional block diagram of another embodiment of the data collection device.

FIG. 3 shows an embodiment of the data collection device 10b that is usable to read the matrix code symbol 12 or other 1D or 2D machine-readable symbol using scanning. In FIG. 3, the various labels having a "b" identify similar components as those of FIG. 2 that are labeled with an "a." The detailed description of such components are initially provided with respect to the embodiment of FIG. 2, and for the sake of brevity, the description of such components in the context of their subsequently b-labeled counterparts in FIG. 3 are abbreviated or omitted.

In one embodiment, the symbol reading components (e.g., the sensor or sensor assembly) of the data collection device 10b are in the form of a photodetector 42 and one or more illumination sources 44 to direct scanning light at a target machine-readable symbol. The sensor can include a separate light detector (not shown), such the light detector 32 of FIG. 2, to detect the amount of light detected by the photodetector 42—however, in general, the signal generated by the photodetector 42 is indicative of the amount of light that is being received and therefore a separate light detector is not used or needed. The aiming light source 30b provides the aiming beam 14.

An example of the illumination source 44 of one embodiment is a laser, LED, or other suitable light source that can be used for scanning data. The data collection device 10b can employ suitable optics such as lens and mirrors 46, controlled by a motor controller 48, for directing the aiming beam 14 at the target machine-readable symbol. Additionally or alternatively, the motor controller 48 and lens and mirrors 46 can operate to direct modulated light reflected from the target symbol to the photodetector 42.

An analog-to-digital (A/D) converter 50 transforms the analog electrical signals from the photodetector 42 and/or other signals into digital signals for use by the microprocessor 34b. For example for reflected light that is received by the photodetector 42 that contains encoded data, the microprocessor 34b operates on the digital signals obtained from the received signals to decode or otherwise obtain the underlying encoded data.

As with the embodiment of FIG. 2, the data collection device 10b can include a gain unit 63b that generates a signal to adjust a gain of the photodetector 42. The microprocessor 34b can deactivate the aiming light source 30b based on the signals provided by the photodetector 42, the gain unit 63b, the trigger 20b, and/or combination thereof or based on any other signal associated with the amount of light received by the photodetector 42. An embodiment of the data collection device 10b that employs such deactivation technique(s) can also work in conjunction with software or other machine-readable instruction stored in the ROM 40b or other machine-readable storage medium. This deactivation is described in further detail with respect to FIG. 4.

Figure 4:
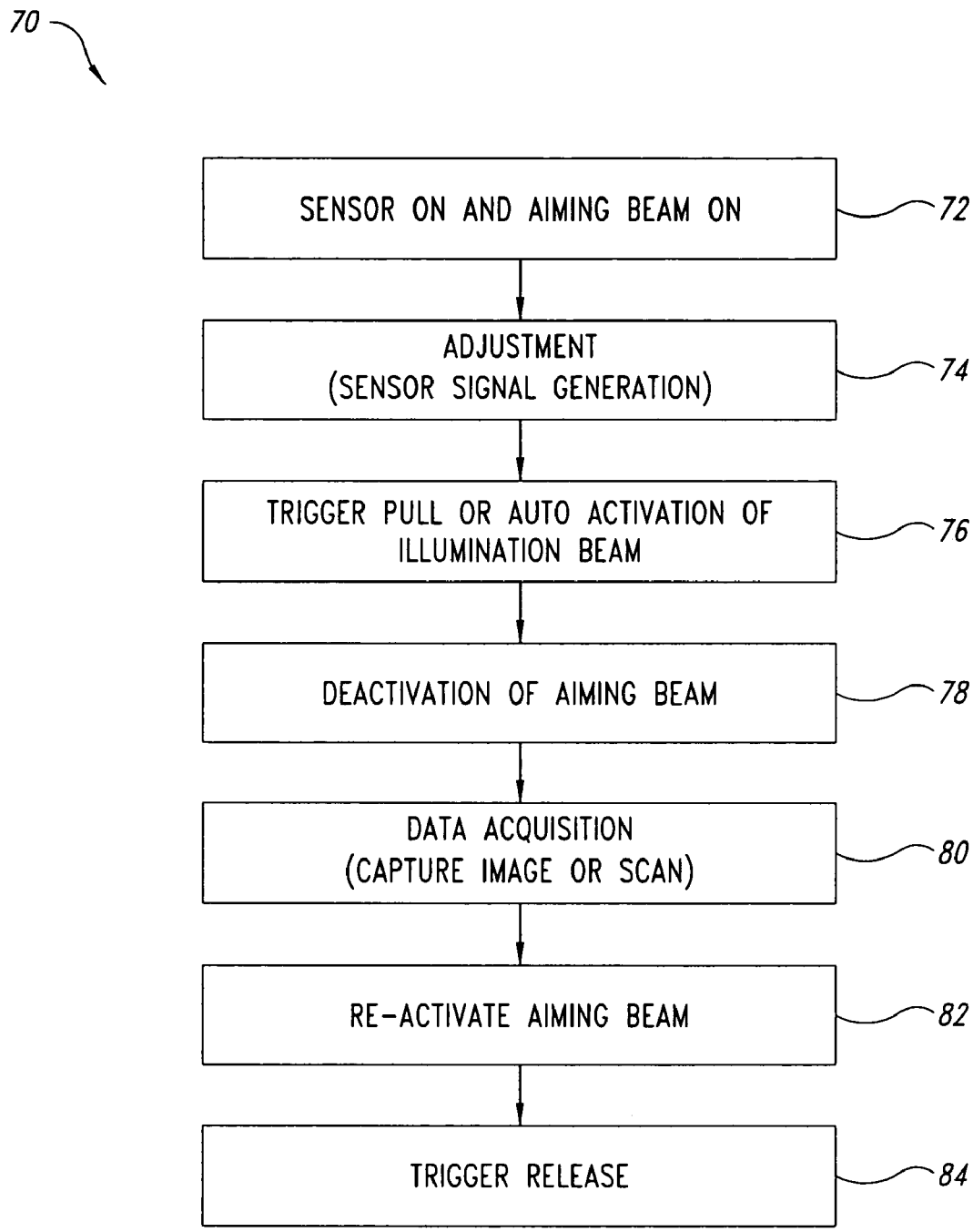
FIG. 4 is a flowchart of a method that includes deactivating the aiming beam prior to reading the target machine-readable symbol.

FIG. 4 is a flow diagram 70 of a technique that involves deactivation of the aiming beam 14 prior to reading a target data carrier, such as the matrix code symbol 12, a barcode symbol, or other machine-readable symbol, using imaging or scanning. In an embodiment, some of the operations depicted in the flow diagram 70 can be implemented through software or other machine-readable instructions executable by a processor (such as the microprocessor 34a) and stored on a machine-readable medium (such as the RAM 36a or the ROM 40a). It is appreciated certain operations in the flow diagram 70 can be suitably added, removed, combined, or modified.

At a block 72, the sensor (e.g., the image detector 62 or the photodetector 42) is ON and ready to receive light reflected from a target data carrier and/or ambient light. The aiming light source 30a (or 30b) is also ON and generating the aiming beam 14.

At a block 74, sensor adjustment is being performed. More specifically according to various embodiments, singly or in combination of the below:

A. The light detector 32 senses the amount of light being received by the image detector 62. The received light can comprise ambient light or light from the aiming beam 14 that is reflected from the matrix code symbol 12. Alternatively or additionally if the illumination source 60 is generating flood illumination (such as at a block 76 if the user has pulled the trigger 20a at least partway to activate the illumination source 60 or if the illumination source 60 is automatically activated), the reflected light can comprise reflected illumination light (e.g., a portion of the acquisition beam 22 that is reflected from the matrix code symbol 12), plus ambient light and reflected light from the aiming beam 14.

The light detector generates a signal indicative of the amount of received light. The microprocessor 34a receives this signal and optimally generates an adjustment signal to adjust a level of illumination that is output from the illumination source 60 (e.g., increase or decrease). The degree of adjustment by the microprocessor 34a can include compensation considerations. For example, if the reflected aiming beam 14 substantially contributes to the amount of light received by the image detector 62, then the microprocessor 34a can adjust the output of the illumination source 60 such that when the aiming beam 14 is deactivated prior to image acquisition, the reflected light received by the image detector 62 (provided from the reflected acquisition beam 22 and from ambient light) is at least at a minimum level for satisfactory image quality. When the microprocessor 34a has completed adjusting the output of the illumination source 60, the adjustment signal is terminated or otherwise deactivated.

B. Alternatively or additionally to adjusting the output of the illumination source 60, the microprocessor 34a can optimally use the same adjustment signal or other adjustment signal to change the size of the opening of the aperture 61 at the block 74, so as to increase or decrease the amount of light received by the image detector 62. Again, the change in aperture size can include compensation considerations, such as adjustment of the aperture 61 to a size that compensates for the reduced amount of light that the image detector 62 may receive if the aiming beam 14 is deactivated prior to image acquisition. The adjustment signal to the aperture 61 is deactivated or otherwise terminated when the aperture 61 has been adjusted to the intended size.

C. Alternatively or additionally to changing the level of illumination and the aperture size, the microprocessor 34a can optimally adjust the sensitivity of the image detector 62 by proving an adjustment signal to the gain unit 63a. Alternatively, the image detector 62 can automatically adjust its gain, such as through a feedback mechanism that provides an adjustment signal, without necessarily using the microprocessor 34a. As before, the level of adjustment (gain adjustment in this case) can include compensation considerations, such as lower levels of reflected light that the image detector 62 may receive if the aiming beam 14 is deactivated prior to image acquisition. In such a case, the gain can be adjusted, prior to image acquisition, such that the gain of the image sensor 62 is higher than a minimum required—when the aiming beam 14 is deactivated prior to image acquisition, therefore, the output of the image detector 62 is at least at a minimum level that is usable for subsequent sampling of the acquired image.

D. In the context of the data collection 10b (for scanning) at the block 74, similar operations as A and C above may be implemented. For example, the photodetector 42 generates an output that is indicative of the amount of light that is being received—based on this signal, the microprocessor can optimally generate an adjustment signal to increase or decrease the output of the illumination source 44. The adjustment signal is terminated or otherwise deactivated when the photodetector is receiving light at predetermined acceptable levels. Alternatively or additionally, the gain of the photodetector 42 can optimally be adjusted using the gain unit 63b as described above. As before, the level of adjustment of the illumination source 44 and/or the gain unit 63a can include the compensation considerations.

As stated above for the block 76, the user pulls the trigger 20a to turn on the acquisition beam 22 or the acquisition beam 22 can automatically activate to provide illumination. In the context of the data collection device 10a (imager type), activation of the acquisition beam 22 at the block 74 involves flood illuminating the matrix code symbol 12 but not yet acquiring its image. In the context of the data collection device 10b (scanner type), activation of the acquisition beam 22 at the block 74 involves activation of the illumination source 44, but movement of the acquisition beam 22 to scan is not yet being performed.

In an embodiment, user actuation of the trigger 20a at the block 76 can be used in conjunction with the adjustment signals of the block 74 to determine whether the aiming beam 14 is to be deactivated. For example, software logic can compare whether the adjustment signal(s) is deactivated (indicating that adjustment of the illumination source, aperture, and/or gain is completed and therefore reading of the target machine-readable symbol can begin) and whether the trigger 20a is being actuated. If both conditions are met, then the aiming beam is deactivated at a block 78. Alternatively or additionally, hardware logic can be used in an embodiment to determine if both conditions are met. Still alternatively or additionally, actuation of the trigger 20a can be used as an override to the adjustment signals, regardless of whether the adjustment signals are active or inactive, to deactivate the aiming beam 14 at the block 78.

At a block 80, data acquisition is performed with the aiming beam 14 deactivated. Thus, the data collection device 10a can capture the image of the matrix code symbol 12 by using shutter activation, for example. Also at the block 80, the data collection device 10b can begin scanning a target machine-readable symbol with the aiming beam 14 deactivated.

At a block 82, the aiming beam 14 is re-activated, such as after imaging or scanning is completed at the block 80. The aiming beam 14 can also be activated upon release of the trigger 20a at a block 84.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For example, components of the data collection devices 10a and 10b can be combined into a single multi-mode data collection device. In such a device, deactivation of the aiming beam 14 based on sensor signals can be implemented in the manner described above.

As another example, various embodiments have been described as using a sensor signal to deactivate an aiming beam. These embodiments can be modified or other embodiments can be provided wherein any suitable type of adjustment of an illumination condition can be triggered in response to one or more sensor signals or other conditions.

These and other modifications can be made to the embodiments in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An automatic data collection device to read data carriers such as machine-readable symbols, the automatic data collection device comprising:
   a first light source to generate an aiming beam to be directed at a target machine-readable symbol;
   a second light source to generate an acquisition beam to read data encoded in the target machine-readable symbol;
   a sensor to receive at least a portion light returned from the target machine-readable symbol and to generate a sensor signal that is associated with the received light; and
   a component coupled to the sensor to deactivate the aiming beam, based on the sensor signal generated by the sensor, prior to reading the target machine-readable symbol with the acquisition beam.

2. The automatic data collection device of claim 1 wherein the component comprises a processor to receive the sensor signal and to generate an adjustment signal based on the sensor signal, the adjustment signal being usable by the processor to deactivate the aiming beam and to adjust an illumination level for the sensor based on a level of said portion of light returned from the target machine-readable symbol.

3. The automatic data collection device of claim 2 wherein the adjustment signal comprises a signal to change an output level of the second light source to adjust the illumination level, the processor being coupled to deactivate the aiming beam if the adjustment signal stops changing the output level.

4. The automatic data collection device of claim 2 wherein the adjustment signal comprises a signal to change an aperture size of the sensor to control an amount of light received by the sensor, the processor being coupled to deactivate the aiming beam if the adjustment signal stops changing the aperture size.

5. The automatic data collection device of claim 2 wherein the adjustment signal comprises a signal to change a gain of the sensor, the processor being coupled to deactivate the aiming beam if the adjustment signal stops changing the gain.

6. The automatic data collection device of claim 2, further comprising a trigger coupled to the processor, wherein actuation of the trigger alone or in combination with a condition of the adjustment signal is usable by the processor to determine whether to deactivate the aiming beam.

7. The automatic data collection device of claim 1 wherein the component comprises a trigger that is actuable to deactivate the aiming beam in response to user actuation alone or in combination with a condition of an adjustment signal corresponding to the sensor signal.

8. The automatic data collection device of claim 1 wherein the second light source comprises a flood illumination source to image the target machine-readable symbol using the acquisition beam.

9. The automatic data collection device of claim 1 wherein the second light source comprises a scanning illumination source to scan the target machine-readable symbol using the acquisition beam.

10. A method usable for an automatic data collection device to read machine-readable symbols, the method comprising:
    generating a user-perceptible aiming beam to be directed at a target machine-readable symbol;
    determining an amount of light returned from the target machine-readable symbol and received by a detector of the automatic data collection device;
    generating a detector signal representative of the light received by the detector;
    using the generated detector signal to adjust an illumination condition of the detector; and
    using the generated detector signal to deactivate the aiming beam prior to reading the target machine-readable symbol.

11. The method of claim 10 wherein using the generated detector signal to adjust the illumination condition of the detector includes generating an adjustment signal to adjust an illumination output of the data collection device that is directed towards the target machine-readable symbol, and wherein using the generated detector signal to deactivate the aiming beam includes deactivating the aiming beam if the adjustment signal stops adjustment of the illumination output.

12. The method of claim 10 wherein using the generated detector signal to adjust the illumination condition of the detector includes generating an adjustment signal to adjust an aperture for the detector, and wherein using the generated detector signal to deactivate the aiming beam includes deactivating the aiming beam if the adjustment signal stops adjustment of the aperture.

13. The method of claim 10 wherein using the generated detector signal to adjust the illumination condition of the detector includes generating an adjustment signal to adjust a gain of the detector, and wherein using the generated detector signal to deactivate the aiming beam includes deactivating the aiming beam if the adjustment signal stops adjustment of the gain.

14. The method of claim 10, further comprising:
    detecting actuation of a trigger of the data collection device; and
    deactivating the aiming beam in response to actuation of the trigger or in response to actuation of the trigger in combination with a condition of the detector signal.

15. An automatic data collection system for reading machine-readable symbols, the automatic data collection system comprising:
    means for generating a user-perceptible aiming beam to be directed at a target machine-readable symbol;
    means for receiving light returned from the target machine-readable symbol;
    means for generating a signal representative of the received light; and
    means for adjusting an illumination condition based on the generated signal and for deactivating, in response to the generated signal, the aiming beam prior to reading the target machine-readable symbol.

16. The automatic data collection system of claim 15 wherein the means for adjusting the illumination condition based on the generated signal includes means for using an adjustment signal for adjusting an illumination output directed towards the target machine-readable medium.

17. The automatic data collection system of claim 15 wherein the means for adjusting the illumination condition based on the generated signal includes means for using an adjustment signal for adjusting an aperture through which the returned light passes.

18. An automatic data collection system for reading machine-readable symbols, the automatic data collection system comprising:
   means for generating a user-perceptible aiming beam to be directed at a target machine-readable symbol;
   means for receiving light returned from the target machine-readable symbol;
   means for generating a signal representative of the received light; and
   means responsive to the generated signal for adjusting a gain of the means for receiving the returned light, and for deactivating, in response to the generated signal, the aiming beam prior to reading the target machine-readable symbol.

19. An automatic data collection system for reading machine-readable symbols, the automatic data collection system comprising:
   means for generating a user-perceptible aiming beam to be directed at a target machine-readable symbol;
   means for receiving light returned from the target machine-readable symbol;
   means for generating a signal representative of the received light; and
   means responsive to the generated signal for deactivating the aiming beam prior to reading the target machine-readable symbol.

20. The automatic data collection system of claim 19, further comprising actuable trigger means for deactivating the aiming beam independently of or in combination with the generated signal.

21. The automatic data collection system of claim 19, further comprising additional means for supporting operation of the means for receiving returned light, including means for processing data encoded in the received returned light.

22. An article of manufacture, comprising:
   a computer-readable medium usable with an automatic data collection device to read machine-readable symbols and having instructions stored thereon that are executable by a processor to control operation of a user-perceptible aiming beam of the data collection device, by:
   generating said user-perceptible aiming beam to be directed at a target machine-readable symbol;
   determining an amount of light returned from the target machine-readable symbol and received by a detector of the automatic data collection device;
   generating a detector signal representative of the light received by the detector; and
   using the generated detector signal to adjust an illumination condition of the detector, and deactivating, in response to the generated detector signal, the aiming beam prior to reading the target machine-readable symbol.

23. The article of manufacture of claim 22 wherein the instructions to use the generated detector signal to adjust an illumination condition of the detector include instructions that are executable by the processor to control operation of the aiming beam, by:
   generating a first adjustment signal based on the detector signal to adjust an illumination output of the data collection device;
   generating a second adjustment signal based on the detector signal to adjust an aperture size of the detector;
   generating a third adjustment signal based on the detector signal to adjust a gain of the detector; and
   using a condition of any of the generated first, second, and third adjustment signals to determine whether to deactivate the aiming beam.

24. The article of manufacture of claim 23 wherein the computer-readable medium further includes instructions stored thereon that are executable by the processor to control operation of the aiming beam, by:
   generating a trigger signal indicative of whether a trigger of the data collection device is actuated;
   deactivating the aiming beam based on a condition of the trigger signal or based on a condition of the trigger signal in combination with any of the generated first, second, and third adjustment signals.

* * * * *

UNITED STATES PATENT AND TRADEMARK OFFICE
CERTIFICATE OF CORRECTION

PATENT NO.         : 7,490,776 B2
APPLICATION NO.    : 11/280955
DATED              : February 17, 2009
INVENTOR(S)        : Serge Thuries Page 1 of 1

It is certified that error appears in the above-identified patent and that said Letters Patent is hereby corrected as shown below:

Title Page;
Item 73
"Intermec Scanner Technology Center, Labege Cedex (FR)" should read as --Intermec IP Corp., Woodland Hills, CA--.

Signed and Sealed this

Eighteenth Day of August, 2009

David J. Kappos
*Director of the United States Patent and Trademark Office*